(12) United States Patent
Wieckhorst et al.

(10) Patent No.: US 12,114,586 B2
(45) Date of Patent: Oct. 15, 2024

(54) TRACTOR AND METHOD FOR OPERATING A TRACTOR

(71) Applicant: CLAAS Tractor SAS, Vélizy-Villacoublay (FR)

(72) Inventors: Jan Carsten Wieckhorst, Uelzen Ortsteil Hanstedt (DE); Christian Ehlert, Bielefeld (DE); Christian Birkmann, Versmold (DE)

(73) Assignee: CLAAS Tractor S.A.S, Vélizy-villacoublay (FR)

( * ) Notice: Subject to any disclaimer, the term of this patent is extended or adjusted under 35 U.S.C. 154(b) by 585 days.

(21) Appl. No.: 17/362,055

(22) Filed: Jun. 29, 2021

(65) Prior Publication Data
US 2022/0000006 A1 Jan. 6, 2022

(30) Foreign Application Priority Data
Jul. 3, 2020 (DE) .......................... 102020117674

(51) Int. Cl.
*A01B 71/02* (2006.01)
*A01B 59/06* (2006.01)

(52) U.S. Cl.
CPC ............ *A01B 71/02* (2013.01); *A01B 59/067* (2013.01)

(58) Field of Classification Search
CPC .............................. A01B 71/02; A01B 59/067
See application file for complete search history.

(56) References Cited

U.S. PATENT DOCUMENTS 5,270,496 A * 12/1993 Langen .................. G01G 19/08
177/210 C
10,143,125 B2 12/2018 Schleyer
(Continued)

FOREIGN PATENT DOCUMENTS

DE 102007040344 A1 * 1/2009 ........... A01B 63/111
EP 1358784 A1 11/2003
(Continued)

OTHER PUBLICATIONS

European Search Report for European Application No. 21176826.2-1004 dated Nov. 25, 2021.

*Primary Examiner* — Vivek D Koppikar
*Assistant Examiner* — Jeffrey R Chalhoub
(74) *Attorney, Agent, or Firm* — Lempia Summerfield Katz LLC

(57) ABSTRACT

A tractor with at least one lifting mechanism that has an upper link and lower links and actuators associated therewith, at least one attachment adapted to the lifting mechanism, and a driver assistance system is disclosed. The driver assistance system optimizes the operation of the tractor and has a computing unit, a memory unit and at least one input interface. The computing unit processes information generated by machine-internal sensor systems, external information, and information that may be saved in the memory unit. The tractor and/or the at least one attachment include a control device for controlling and regulating the tractor and the attachment. The driver assistance system comprises an automatic lifting mechanism that is configured to function based on characteristics, and to optimize adjustment of at least one work parameter of the tractor depending on selectable regulation strategies and/or optimization target variables saved in the memory unit.

20 Claims, 7 Drawing Sheets

(56) References Cited

U.S. PATENT DOCUMENTS

2016/0039480 A1    2/2016  Pichlmaier
2017/0086348 A1    3/2017  Schleyer
2017/0325394 A1*  11/2017  Clement ................ A01B 71/02

FOREIGN PATENT DOCUMENTS

| EP | 2016818 A1 | 1/2009 |
| EP | 2583543 A1 | 4/2013 |
| EP | 3243368 A2 | 11/2017 |
| EP | 3146822 B1 | 3/2019 |
| EP | 3549417 A1 | 10/2019 |

* cited by examiner

TRACTOR AND METHOD FOR OPERATING A TRACTOR

CROSS REFERENCE TO RELATED APPLICATION

This application claims priority under 35 U.S.C. § 119 to German Patent Application No. DE 102020117674.0 filed Jul. 3, 2020, the entire disclosure of which is hereby incorporated by reference herein.

TECHNICAL FIELD

The present invention relates to a tractor that includes at least one lifting mechanism, and a method for operating the same.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

When cultivating the soil of agricultural land, generally a tractor is used as a towing vehicle to which an attachment is adapted or attached. The tractor may be equipped with a lifting mechanism that has an upper link and a lower link. The attachment may be adapted to the lifting mechanism, such as configured for operation with the lifting mechanism, and may be transferred thereby from a transport position into a working position and vice versa. In the working position of the attachment, the attachment transfers forces to the soil. A tractor of the aforementioned kind is illustrated in US patent Application Publication No. 2017/0325394, incorporated by reference herein in its entirety. The tractor comprises a driver assistance system that optimizes the operation of the tractor and has a computing unit, a memory unit, and at least one display unit as an input interface, wherein the computing unit processes information generated by machine-internal sensor systems and information saved in the memory unit. The tractor and/or the attachment comprise a control device for controlling and regulating the tractor as well as the attachment. The driver assistance system in US patent Application Publication No. 2017/0325394 may be structured so that it forms an automated prime mover and an automated attachment, wherein the automated prime mover and the automated attachment may cause the operation of the tractor and/or the at least one attachment to be improved or optimized. To accomplish this, specific improvement or optimization strategies are used for the mode of operation of the attachment, such as a power hop to prevent load-dependent rocking of the system comprising (or consisting of) a tractor and attachment, stubble processing, soil loosening, flatness, mixing, seed bed preparation, crumbling and reconsolidation.

In traction work on soils of agricultural lands, the ratio comprising (or consisting of) the horizontal traction of the chassis or the soil engagement means (driving force) and the vertical force on the chassis or the soil engagement means (wheel load) may need to be adjusted to a certain ratio so that maximum traction efficiency results. The horizontal chassis force or drive force results from the tractive power requirement of the equipment under given work parameters such as working depth, working speed and the specific prevailing work conditions. The vertical chassis force or wheel load may be adapted or modified within limits dictated by the tractor design such as the tractor empty weight, the permissible axle load and the permissible overall tractor weight by ballasting the tractor in order to adjust the ratio of the vertical chassis force and horizontal chassis force in a manner that leads to improved traction efficiency. With modern tractors, the lifting mechanism has a position control, tractive force control and mixed control as a weighted combination of the position and tractive force control. Moreover, a slip control may be superimposed on the tractive force control. The particular lifting mechanism controls may be based on the horizontal chassis force and drive force as controlled variables. In the context of these controls, an operator specifies a target value to be maintained on the basis of which lifting mechanism is controlled.

DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
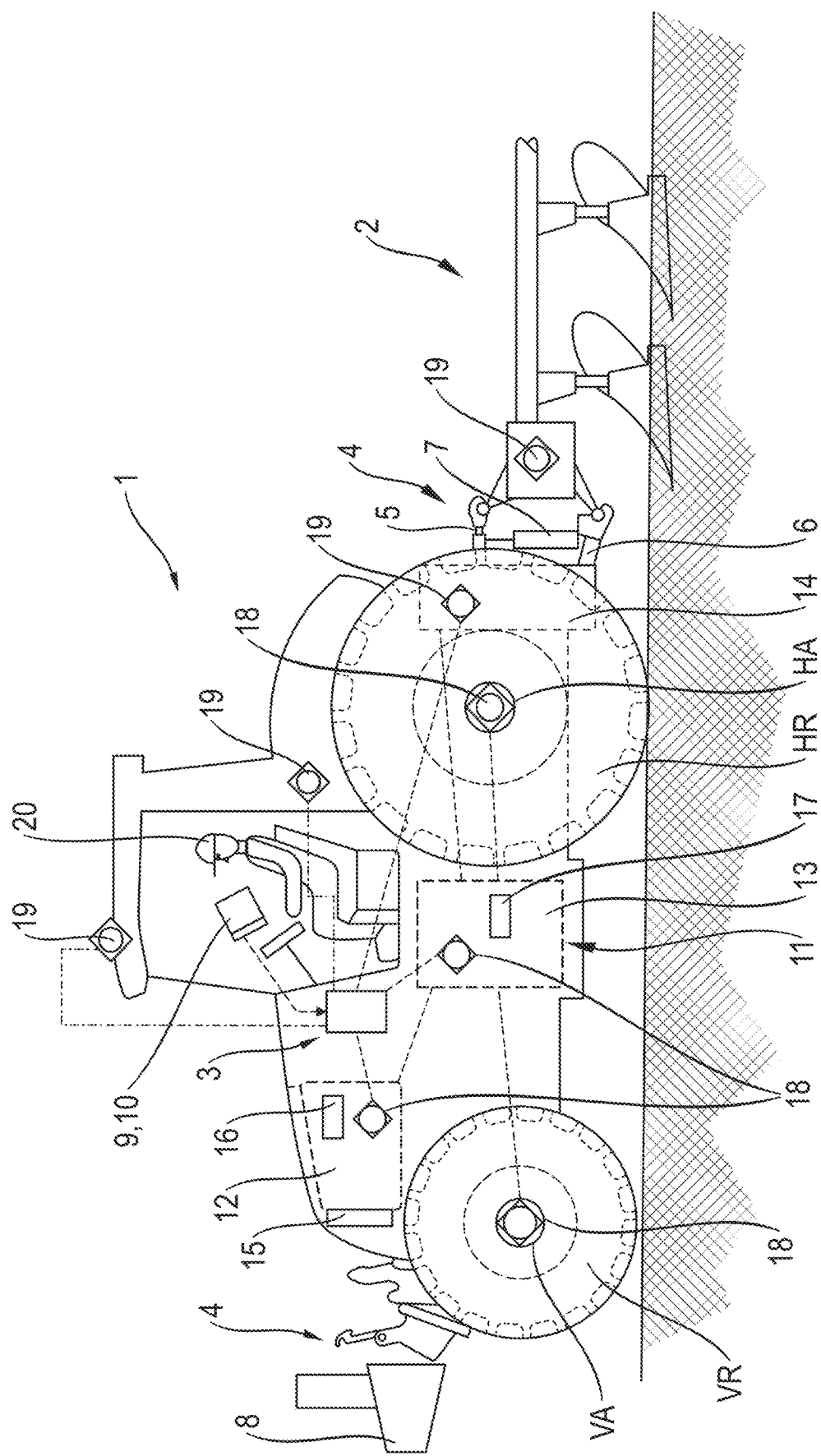
FIG. 1 illustrates a schematic representation of a tractor and an attachment adapted to the tractor.

As discussed in the background, the operator specifies a target value to be maintained on the basis of which the lifting mechanism is controlled. In this regard, the operator personally evaluates the setting with which the best compromise is achieved between the performance, efficiency and work quality. In addition to requiring the operator to personally assessment the current situation, changes in the conditions of use frequently occur during a cultivation process that may be overlooked by the operator and may therefore not be taken into consideration.

Accordingly, in one or some embodiments, a tractor that is configured to improve operation (such as optimization) of the tractor's operation while working is enabled, such as against the background of arising conditions of use during a cultivation process.

In one or some embodiments, a tractor is disclosed with at least one lifting mechanism that has an upper link and lower link(s) and actuators associated therewith, and at least one attachment adapted to the lifting mechanism, a driver assistance system that improves or optimizes the operation of at least one tractor and has at least one computing unit, at least one memory unit and at least one input interface, wherein the computing unit is configured to process information generated by machine-internal sensor systems, external information, and information that may be saved in the memory unit, and wherein the tractor and/or the at least one attachment comprise a control device for controlling and regulating the tractor and/or the attachment, wherein the driver assistance system comprises an automatic lifting mechanism, wherein the automatic lifting mechanism is configured to function based on characteristics, and wherein the automatic lifting mechanism is configured to control at least one aspect of the at least one lifting mechanism in order to adjust at least one work parameter of the tractor (e.g., for optimized adjustment of at least one work parameter of the tractor depending on selectable regulation strategies and/or optimization target variables saved in the memory unit).

In particular, the automatic lifting mechanism is configured for optimized adjustment of at least one adjustment parameter of the at least one lifting mechanism as a work parameter of the tractor depending on selectable regulation strategies and/or optimization target variables saved in the memory unit. With adapted or attached equipment, part of the attachment weight and/or process forces acting on the soil cultivation tools of the attachment are transferred to the tractor. The automatic lifting mechanism may enable improved or optimized adjustment by regulating the work parameters of the tractor that have an influence on the vertical chassis force, such as at least one adjustment parameter of the at least one lifting mechanism as a work parameter of the tractor. Accordingly, improved and accelerated optimized adjustment in comparison to the prior art is achieved through which changes in the conditions of use during a cultivation process are considered.

Generally, tractors have a front lifting mechanism and a rear lifting mechanism that may be adjusted jointly or independent of each other by the automatic lifting mechanism.

In particular, the improvement or optimization of the at least one work parameter by the automatic lifting mechanism may include considering the effect on the attachment adapted to the lifting mechanism as well as the reciprocal transfer of force between the tractor and the attachment. The nature and the type of attachment may be of great importance. Accordingly, attachments designed as soil cultivation equipment, such as for example a plow or grubber, may have a different influence on the traction efficiency than for example attachments, such as manure spreaders or pack top seed drills, that do not directly engage with the soil or only exert slight horizontal forces in comparison to soil cultivation equipment.

In one or some embodiments, the at least one work parameter may include at least one resulting force or force component transmitted from the attachment to the tractor that acts in a horizontal and/or vertical direction.

In one or some embodiments, the at least one work parameter may be at least one or more lifting mechanism adjustment parameter(s) comprising any one, any combination, or all of the lifting mechanism position of the upper link and/or the lower links; lifting mechanism force of the lower links; length of the upper link and/or the lower link; upper link force; length of a lifting strut; and lifting mechanism geometry. In addition to the forces exerted on the lifting mechanism as lifting mechanism adjustment parameters, the particular lifting mechanism geometry that results from the lifting mechanism position as well as length adjustments of the upper link, lower links and lifting mechanism may also have an influence, as a lifting mechanism adjustment parameter, on optimization, particularly since the forces and the lifting mechanism geometry may influence each other.

The selectable regulation strategy may at least comprise one or more strategies, including any one, any combination, or all of: "efficiency"; "performance"; "cost"; "quality"; "yield". The regulation strategies, which may be selectable such that indicators of the selection may be stored in the at least one memory unit, may constitute approaches based on an overall consideration of the tractor and attachment during optimization. In so doing, the consumption per area (e.g., gallon/acre) and/or the operating hours needed for cultivation may be improved or optimized according to the regulation strategy of "efficiency". The regulation strategy of "performance" may be based on improving or optimizing the output per area (e.g., acre/hour). The regulation strategy of "cost" is directed to improving or optimizing the cost per area (e.g., $/per acre). The regulation strategy of "quality" is directed to yielding an improvement or an optimization of the work parameters for the tractor and attachment to achieve a consistent and superior work quality. The regulation strategy of "yield" is directed to prioritizing the improvement or optimization of yield. It is moreover contemplated to specify a weighted average comprising (or consisting of) all or parts of the aforementioned strategies through the least one work parameter.

The optimization target variables may at least comprise target variable(s) including any one, any combination, or all of: "output per area"; "consumption per area"; "yield per area"; "cost per area"; or "work quality". The optimization target variables, which may be selectable such that indicators of the selection may be stored in the at least one memory unit, make it possible to establish specific individual aspects, such as in different combinations with each other, for optimization by the automatic lifting mechanism. The optimization target variable of "cost per area" may, for example, primarily include accruing personnel costs, fuel costs, wear costs, operating hours, etc. The optimization target variable of "performance per area" may, for example, primarily concern increasing the cultivated area and/or processed bulk of feedstocks. The optimization target variable of "work quality" tends, for example, to prioritize mixing of crop residues with the soil, crumbling, reconsolidation, feed quality, soil loosening, the reduction of soil unevenness, etc. in optimization.

By selecting a regulation strategy and/or one or more optimization target variables, the overall system comprising (or consisting of) a tractor and attachment may be improved or optimized overall by adjusting the lifting mechanism adjustment parameters through the automatic lifting mechanism. "Optimized overall" may mean that, in contrast to the prior art, the regulation of lifting mechanism adjustment supports not just position regulation, tractive force regulation, or mixed regulation comprising (or consisting of) position and tractive force regulation, it also takes into account influences that, for example, result from occurring dispersions of efficiencies and/or operating behavior of the drivetrain including the tractor chassis. Advantageously, this also takes into account the dispersions of efficiencies that occur in practice under different conditions of use.

In one or some embodiments, the control device of the tractor together with the driver assistance system may form the automatic lifting mechanism in that the computing unit is configured to autonomously ascertain parameters for implementing the chosen regulation strategy(ies) and/or optimization target variable(s), and to specify them to the control device of the tractor, that influence the at least one working parameter to be adjusted. The automatic lifting mechanism may further comprise the at least one lifting mechanism and its actuators for adjusting the upper link and lower link by adjusting and adapting the lifting mechanism adjustment parameters.

In particular, the parameters to be taken into account for the optimized control of the at least one lifting mechanism may be any one, any combination, or all of: work parameters of the tractor; work parameters of a drivetrain of the tractor; work parameters of the attachment; or environmental parameters resulting from environmental conditions. In one or some embodiments, at least the work parameters of the drivetrain and the attachment are incorporated in improved or optimized control since they may at least be directly ascertained in the tractor and its drivetrain, or in the attachment. Moreover, environmental parameters may be detected, determined or received by the automatic lifting mechanism that permit conclusions to be drawn about the currently prevailing conditions of the soil to be cultivated on which the tractor and the adapted attachment are moved.

Advantageously, sensor apparatuses may be arranged or positioned at least on the tractor that are configured to determine work parameter(s) and/or environmental parameter(s). Moreover, at least one sensor apparatus may be arranged or positioned on the attachment that at least serves to determine specific work parameters of the attachment. To accomplish this, the attachment may be connected wirelessly and/or by wired communication means to the tractor in order to transmit data from the at least one sensor apparatus of the attachment to the driver assistance system to be evaluated and considered in the improvement or the optimization by the automatic lifting mechanism. Sensor apparatus(es) may, for example, be any one, any combination, or all of: a rotational speed sensor; a torque sensor; a pressure sensor; or a force sensor. Moreover, sensor apparatus(es) may be any one, any combination, or all of: a position sensor for determining the position of components of the lifting mechanism; a position sensor for determining the position of the attachment; or a working depth sensor. The sensor apparatuses for determining work parameters of the tractor may be assigned directly to the drivetrain and its components such as the power take-off or ancillary units. The at least one lifting mechanism of the tractor may have sensor apparatuses through which forces and movements of the upper link and lower links may be determined. Moreover, a position sensor for determining the working height may be assigned to the at least one lifting mechanism. In addition, additional sensor apparatuses may be assigned to the tractor and/or the attachment that are configured to determine operating information or work parameters of the tractor and/or the attachment, as well as to determine and/or receive environmental parameters. Sensor apparatus(es) may, for example, be any one, any combination, or all of: a speed sensor; a tilt sensor; an optical sensor; or a positioning sensor. Using the tilt sensor, for example, a tilt of the tractor and/or the attachment may be detected in the longitudinal and/or transverse direction. This allows the prevailing topology in the particular operating situation to be inferred. This operating information may be supplemented and/or verified by data provided by the positioning sensor.

In one or some embodiments, the lifting mechanism may at least comprise an actuator designed as a lifting mechanism cylinder with a force measuring system assigned to the actuator.

Moreover, the lifting mechanism may comprise at least one length-changeable lifting strut with a force measurement system assigned to the lifting strut.

In one or some embodiments, the lifting mechanism may comprise a force measuring system that is configured to record forces that are introduced into the receiving elements for the attachment arranged at the end of the lower links.

The resulting lifting mechanism forces from the attachment transmitted to or acting on the tractor, in particular in a horizontal and vertical direction, may belong to the group of lifting mechanism adjustment parameters. The forces may be ascertained from any one, any combination, or all of: the force of the lifting mechanism cylinders; the pressure in the hydraulic upper link; the upper link longitudinal force; the signals from the force measuring pin in the lifting mechanism; the cutting forces between the tractor and attachment; the longitudinal forces of the lifting struts; or the current lifting mechanism geometry. The lifting mechanism position of the lower links as well as the length and position of the upper link may comprise additional lifting mechanism adjustment parameters in addition to the forces. Vertical and/or horizontal cutting forces between the tractor and attachment may be measured at the coupling point between the tractor and attachment, and/or on the attachment. The current lifting mechanism geometry (e.g., any one, any combination, or all of: the position of the upper link and/or the lower links; the position of the lifting arm; the length of the lifting struts; or a selected hole position in the lifting struts) may form additional lifting mechanism adjustment parameters.

In particular, the driver assistance system may be configured to receive external information in order to determine work parameters and/or environmental parameters. External information may, for example, be obtained from any one, any combination, or all of: other work machines; an external farm management system; or generally from the Internet.

Moreover, a functional model of the tractor and the attachment that depicts at least part of the functional relationships of the tractor and the attachment may be saved in the memory unit. Accordingly, the various operating situations of the tractor and the adapted attachment may be modeled via the functional model in order to achieve improved or optimized controlling of the actuators of the at least one automatic lifting mechanism in the particular operating situation and taking into account the chosen regulation strategy and/or optimization target variable(s). Alternatively contemplated are also pure black box models that, for example, are based on artificial intelligence (AI) or neural networks, or mixed forms in order to depict at least part of the functional relationships.

At least one n-dimensional characteristic map may be assigned to the at least one lifting mechanism adjustment parameter to depict the functional relationships of the tractor, wherein the particular lifting mechanism adjustment parameter is defined as the output variable of the at least one n-dimensional characteristic map. Using the at least one n-dimensional characteristic map, even complex functional relationships of the overall system comprising (or consisting of) the tractor, attachment and surroundings may be depicted with less or little computing effort. Characteristic curves of the n-dimensional characteristic map may be adapted adaptively or dynamically to the particular situation in order to generate an n-dimensional updated characteristic map in order to consider some or all of the relationships during operation between the tractor, attachment and environmental conditions that have an influence on the regulation strategies, and on the optimization target variable(s), and therefore on the required setting of the at least one lifting mechanism adjustment parameter. The characteristic curves of the n-dimensional characteristic map may be adapted by the automatic lifting mechanism.

In so doing, at least one or more work parameters of the tractor, the attachment and/or environmental parameters resulting from the environmental conditions may form the input variables of the at least one n-dimensional characteristic map. Accordingly, the work parameters such as the lifting mechanism position and the resulting working depth may form signals from sensor apparatuses, designed as tractive force measuring pins, of the lifting mechanism, traction booster settings, as well as forces at the attachment interface as input variables for the n-dimensional characteristic map. The working depth may alternatively or in addition be determined by at least one sensor apparatus provided or positioned on the attachment. Moreover, the work parameters of any one, any combination or all of the output power of the at least one drive motor, motor speed, gearbox ratio, output power of the gearbox, gearbox load, drive power of the at least one ancillary unit and/or the at least one power take off, slip between the soil engagement means of the tractor and the soil, driving force behavior, power flow in the PTO train, and/or power flow in the hydraulic drivetrain and/or an electrical drivetrain may be provided as the input variables. External information as the input variables may comprise any one, any combination, or all of: the weather; soil character; soil type; soil state; or soil moisture. This information may be obtained from external sources and/or manually specified by the operator through an input interface of the driver assistance system. Moreover, any one, any combination, or all of tire size and/or tire type on the tractor axles, the empty weight of the tractor, the ballast of the tractor, and the tractor geometry may form input variables for the least n-dimensional characteristic map. Calculated or measured work parameters such as any one, any combination, or all of the tractive forces, wheel forces, wheel torques, or loads on the axles of the tractor may also form input variables of the at least n-dimensional characteristic map.

Moreover, work parameters of the attachment such as any one, any combination, or all of attachment type, attachment weight, attachment geometry, the type of the attachment interface (e.g., attached or semi-mounted), the working width of the attachment, attachment-specific work parameters adjusted on the attachment such as the front furrow width, pull point, support pressure, working depth, etc. may be input variables of the at least n-dimensional characteristic map.

The above-listed work parameters of the tractor and the attachment as well as environmental parameters may either be measured directly (e.g., absolutely or relatively), calculated from other values (e.g., absolutely or relatively), saved in characteristic maps, or may be obtained from external sources such as by means of georeferenced maps, or online information provided by being retrieved from cloud-based (e.g., external data processing systems).

In one or some embodiments, the computing unit may match the at least one n-dimensional characteristic map during operation, such as cyclically, with the conditions of use of the tractor and the attachment, such that at least one n-dimensional initial characteristic map for the at least one lifting mechanism adjustment parameter is saved in the memory unit, and during the initial ascertainment of the at least one lifting mechanism adjustment parameter, the computing unit performs the ascertainment based on the initial characteristic map (e.g., determining a value of an initial lifting mechanism adjustment parameter).

In so doing, the computing unit may be configured to perform an adaptation or modification of the form of the initial characteristic map to existing conditions of use by using certain work parameters of the at least one tractor, in particular of the attachment adapted thereto as well, or by approaching sampling points in the initial characteristic map. In addition, measured, received, or otherwise determined environmental parameters may be used in order to perform an adaptation or modification of the form of the initial characteristic map to existing conditions of use. If measured parameters are missing in the n-dimensional space of the initial characteristic map or only exist to an insufficient extent and they are not approached or generated in the standard operation of the tractor, sampling points may be approached or generated instead. Starting from the initial characteristic map, the form of the at least n-dimensional characteristic map may be adapted or modified to the current conditions of use by adjusting predefined operating points that represent sampling points in the at least one n-dimensional characteristic map.

In one or some embodiments, while the tractor is operating, the precise form of the at least one n-dimensional characteristic map may be adapted or modified to the current conditions of use by ascertaining at least one of the parameters plotted in the n-dimensional characteristic map. When the tractor with the attachment adapted or modified thereto is in working mode (e.g., when carrying out field cultivation), the conditions of use may be subject to strong fluctuations which may be detected and considered promptly by the automatic lifting mechanism in order to improve or optimize operation according to the chosen regulation strategy and/or the chosen optimization target variable(s). In one or some embodiments, promptly means that the automatic lifting mechanism may react to changes within a time interval depending on the operating variables and reaction times of the actuators of the at least one lifting mechanism in order to bring about a change of at least one lifting mechanism adjustment parameter.

In one or some embodiments, the driver assistance system may be designed based on a data cloud service. In this case, information generated by the sensor apparatuses of the tractor and/or the attachment as well as external information may be transmitted to the cloud service and processed there using algorithms. The processed data may be transmitted to the automatic lifting mechanism as the data to be transmitted, depending on which regulation strategy is selected. Alternatively or in addition, the external computer unit may prepare data, such as external information from service providers, using an algorithm, and may transmit to the automatic lifting mechanism the prepared data as the data to be transmitted, depending on which regulation strategy is selected.

Moreover, a method for operating a tractor is disclosed with the one or more of the functions described above. In particular, a method for operating tractor comprises using the tractor with at least one lifting mechanism that has an upper link as well as lower links and actuators associated therewith, and at least one attachment adapted to the lifting mechanism, a driver assistance system that optimizes the operation of at least one tractor and has a computing unit, a memory unit and at least one input interface, wherein the computing unit processes information generated by machine-internal sensor systems, external information, and information that may be saved in the memory unit, and wherein the tractor and/or the at least one attachment are controlled and regulated by a control device of the tractor and/or the attachment, wherein the driver assistance system comprises an automatic lifting mechanism that functions based on characteristics, and wherein an optimized adjustment of at least one work parameter of the tractor is adjusted by the automatic lifting mechanism depending on selectable regulation strategies and/or optimization target variables saved in the memory unit. In particular, an optimized adjustment of at least one adjustment parameter of the at least one lifting mechanism as a work parameter of the tractor is performed by the automatic lifting mechanism depending on selectable regulation strategies and/or optimization target variables saved in the memory unit.

The method for operating the tractor may have one, some or all of the features, individually or in combination, described above in conjunction with the tractor.

Referring to the figures, FIG. 1 illustrates an example of how a tractor 1 performs an agricultural work order, such as soil cultivation, using an attachment 2 for performing or supporting agricultural work, such as an attachment 2 in the form of a plow. The tractor 1 has a driver assistance system 3 which, inter alia, is configured to record, process and output data that relate to an agricultural workday. The tractor 1 comprises at least one lifting mechanism 4 that has at least one upper link 5 as well as lower link(s) 6 and actuators 7 assigned thereto, of which only one is indicated merely as an example. The attachment 2 is adapted to or configured to work in combination with the lifting mechanism 4 arranged in the rear area of the tractor 1. Another lifting mechanism 4 that is partially shown may be provided on the tractor 1 at the front end that, in the illustrated embodiment, accommodates a ballast weight 8 for ballast. The lifting mechanism 4 may, for example, be designed as a three-point rear power lifter. The lower links 6 may be fastened to the tractor 1 with vertical shafts or pins oriented perpendicular to the driving direction. The attachment 2 may be coupled to the free ends of the lower links 6. The weight force of the attachment 2 may be transferred to the rear axle HA which increases the traction and therefore the tractive power of the tractor 1. The lower links 6 may be either lifted directly or by a lever system with a hydraulic cylinder that are generally termed actuators 7. With larger tractors 1, one hydraulic cylinder per lower link 6 may be used as an actuator 7. Single or dual-acting hydraulic cylinders may be used. With single-acting hydraulic cylinders as the actuators 7, only the dead weight of the attachment 2 is borne. The advantage of dual-acting hydraulic cylinders as the actuators 7 is that, in addition to bearing, pressure may also be exerted on the attachment 2.

Further above the lower links 6, the upper link 5 may be attached in the middle that allows the angle of the attachment 2 to be adjusted. The end of the upper link 5 facing the rear is the third point of a three-point suspension. The upper link 5 may be designed as a threaded spindle which may be extended or shortened without being removed. With heavy tractors 1 and attachments 2, the length of the upper link 5 may be adjusted by dual-acting hydraulic cylinders as the actuators 7, even under a load.

The driver assistance system 3 has at least one input interface 9. As in this case, the input interface 9 may be designed as at least one input device 10 for data entry by the user, and may be coupled to (or be part of) a keyboard, a touchscreen and/or microphone. The input device 10 may be part of the tractor 1, the attachment 2 and/or a mobile device (e.g., a tablet computer).

The tractor 1 has a drivetrain 11. The drivetrain 11 comprises at least one drive motor 12, a gearbox 13, at least one power take-off 14 and at least one ancillary unit 15. In one or some embodiments, the drive motor 12 is designed as an internal combustion engine. Alternative embodiments of the drive motor 12 such as an electric motor or hydraulic motor are contemplated. The drive motor 12 may be controlled by an engine control unit 16. The gearbox 13 may be designed as a power shift gearbox or continuously variable gearbox. The gearbox 13 may be controlled by a gearbox control unit 17. The at least one power take-off 14 may be designed as a PTO shaft that may serve to drive an attachment 2. The PTO shaft as the power takeoff 14 may be provided both in the front area as well as in the rear area of the tractor 1. The at least one ancillary unit 15 may be designed as an engine fan that is part of a cooling device of the drive motor 12. Moreover, the drivetrain 11 may have a hydraulic drivetrain and/or an electric drivetrain. In this case, for example a hydraulic pump and a hydraulic motor or a generator as well as an electric motor may form other ancillary units 15 of the drivetrain 11. The hydraulic drivetrain may serve, inter alia, to operate the at least one lifting mechanism 4 with which the attachment 2 is adapted to the tractor 1.

The tractor 1 has a front axle VA and a rear axle HA to which soil engagement means in the form of wheels VR, HR and/or at least one crawler chassis are assigned. The front axle VA and/or the rear axle HA may be assigned at least one sensor apparatus 18 configured to generate sensor data with which a chassis force acting on one of the axles VA, HA may be determined (e.g., based on analysis of the sensor data generated by the at least one sensor apparatus 18).

Other sensor apparatuses 18 may be assigned to the drivetrain 11 and may be configured to generate respective sensor data, with the respective sensor data then being used to determine work parameters of the drivetrain 11, or respectively its different components. The other sensor apparatuses 18 may, for example, be any one, any combination, or all of: a rotational speed sensor; a torque sensor; a pressure sensor; or a force sensor. The sensor apparatuses 18 for determining work parameters of the drivetrain 11 may be assigned directly to the drivetrain 11. Moreover, additional sensor apparatuses 19 may be assigned to the tractor 1 and/or the attachment 2 that are configured to determine specific work parameters of the tractor 1 and/or the attachment 2 that also may be determined independent of the drivetrain 11. One of the additional sensor apparatuses 19 may, for example, be any one, any combination, or all of: a speed sensor; a tilt sensor; an optical sensor; or a positioning sensor. Moreover, at least one of the additional sensor apparatuses 19 may be configured to receive and/or to determine satellite-based or satellite-supported information such as geodata or vegetation data, which may be external information 28 as well as information 29 saved in the memory unit 26 like topographical data, route planning data and the like. Moreover, at least one of the additional sensor apparatus(es) 19 may be configured to generate data that, when analyzed, may enable a conclusion or a determination to be made about the nature of the soil or subsurface on which the tractor 1 with the attachment 2 is being moved.

An operator 20 of the tractor 1 may enter additional parameters through the input device 10, such as operating, work and/or environmental parameters, such as the kind and/or type of tractor and/or attachment, that may not be automatically detectable, and may transmit them to the driver assistance system 3.

Figure 2:
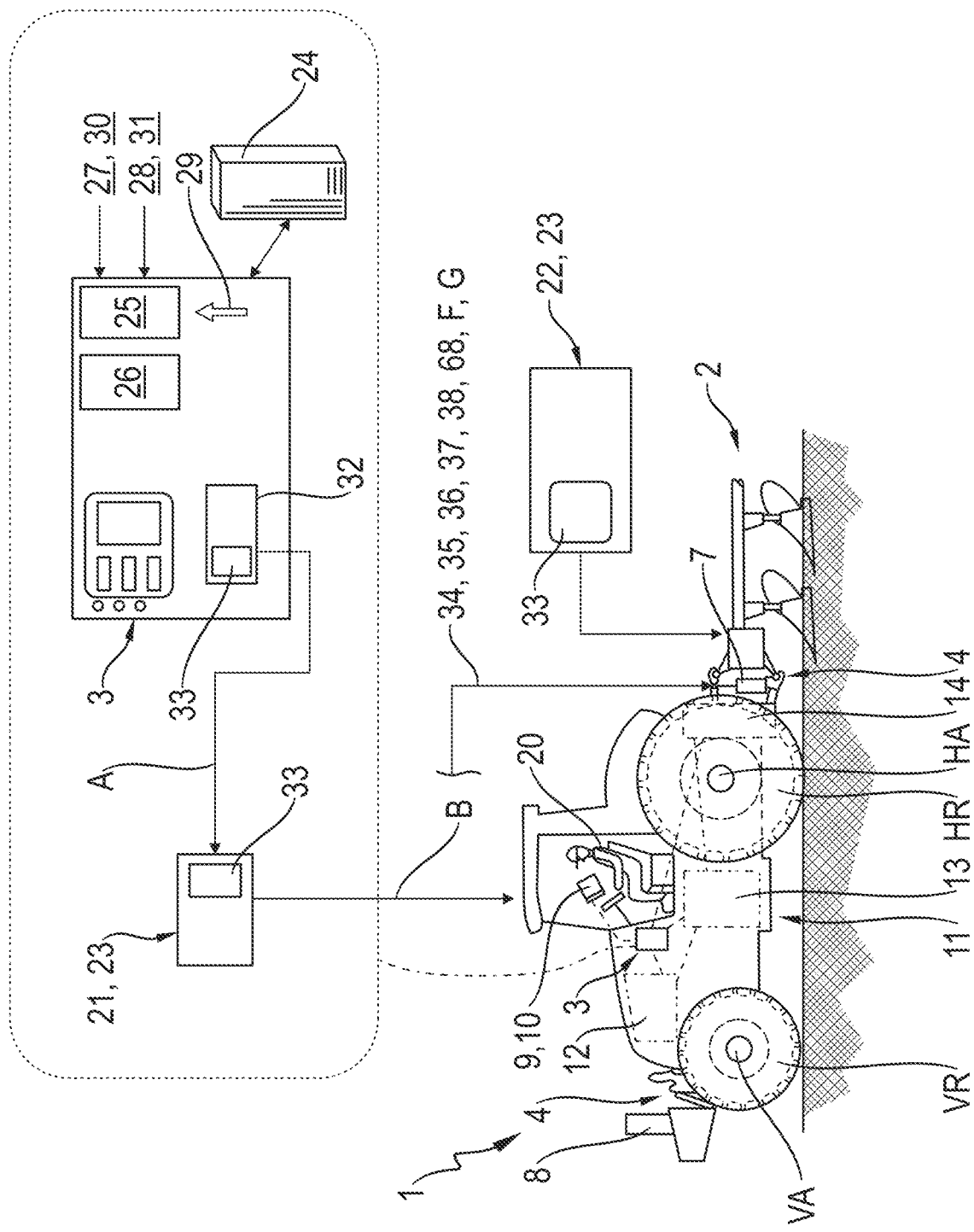
FIG. 2 illustrates a schematic representation of the tractor according to FIG. 1 and a driver assistance system.

FIG. 2 illustrates a schematic representation of the tractor 1 according to FIG. 1 and the driver assistance system 3. The tractor 1 and the attachment 2 are assigned one or more control devices 21, 22 for controlling and regulating the tractor 1 and/or the particular attachment 2. In one or some embodiments, the tractor 1 and the attachment 2 may be assigned either separate control devices 21, 22 for controlling, or a common control unit 23. The common control unit 23 may then either be positioned on one or both of the tractor 1 or the attachment 2, or may be designed to be portable so that the common control unit 23 may be carried by the operator 20 of the tractor 1. The driver assistance system 3 may also be designed based on a data cloud in that data are retrievably and editably saved at least partially on an external, spatially remote memory device of an external server, or on an external computing unit 24 instead of on the memory unit 26. The external computing unit 24 may be part of a data cloud service that may be operated by a third-party provider.

In one or some embodiments, the driver assistance system 3 comprises at least one computing unit 25 and a memory unit 26 in addition to the input interface 9. The computing unit 25 may comprise any type of computing functionality, such as at least one processor (which may comprise a microprocessor, controller, PLA, or the like). The memory unit 26 may comprise any type of storage device (e.g., any type of memory). Though the computing unit 25 and the memory unit 26 are depicted as separate elements, they may be part of a single machine, which includes a microprocessor (or other type of controller) and a memory.

The computing unit 25 and the memory unit 26 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The computing unit 25, using software and/or hardware, is configured to process information 27 (such as sensor data) generated by the sensor apparatuses 18, 19 of the tractor 1 and/or the attachment 2, external information 28, and information 29 savable in the memory unit 26. The information 27 generated or received by the sensor apparatuses 18, 19 may contain information indicative of environmental parameters 30 which may include, inter alia, any one, any combination, or all of: the soil character; soil type; soil state; soil moisture; topography; or weather. The environmental parameters 30 are also partially available as external information or external environmental parameters 31 which in particular may apply to the weather or topographical data.

The sensor apparatuses 18, 19 of the tractor 1 and/or the attachment 2 may transmit the generated information 27 indirectly or directly to the driver assistance system 3. The computing unit 25 is configured, via software and/or hardware, to evaluate the generated information 27. The communication between the engine control unit 16, the gearbox control unit 17, the sensor apparatuses 18, 19 as well as the separate control devices 21, 22 or the control unit 23 and the driver assistance system 3 may be performed via different communication paths such as, for example, a bus system of the tractor 1 or the attachment 2, and/or a wireless communication system.

Figure 5:
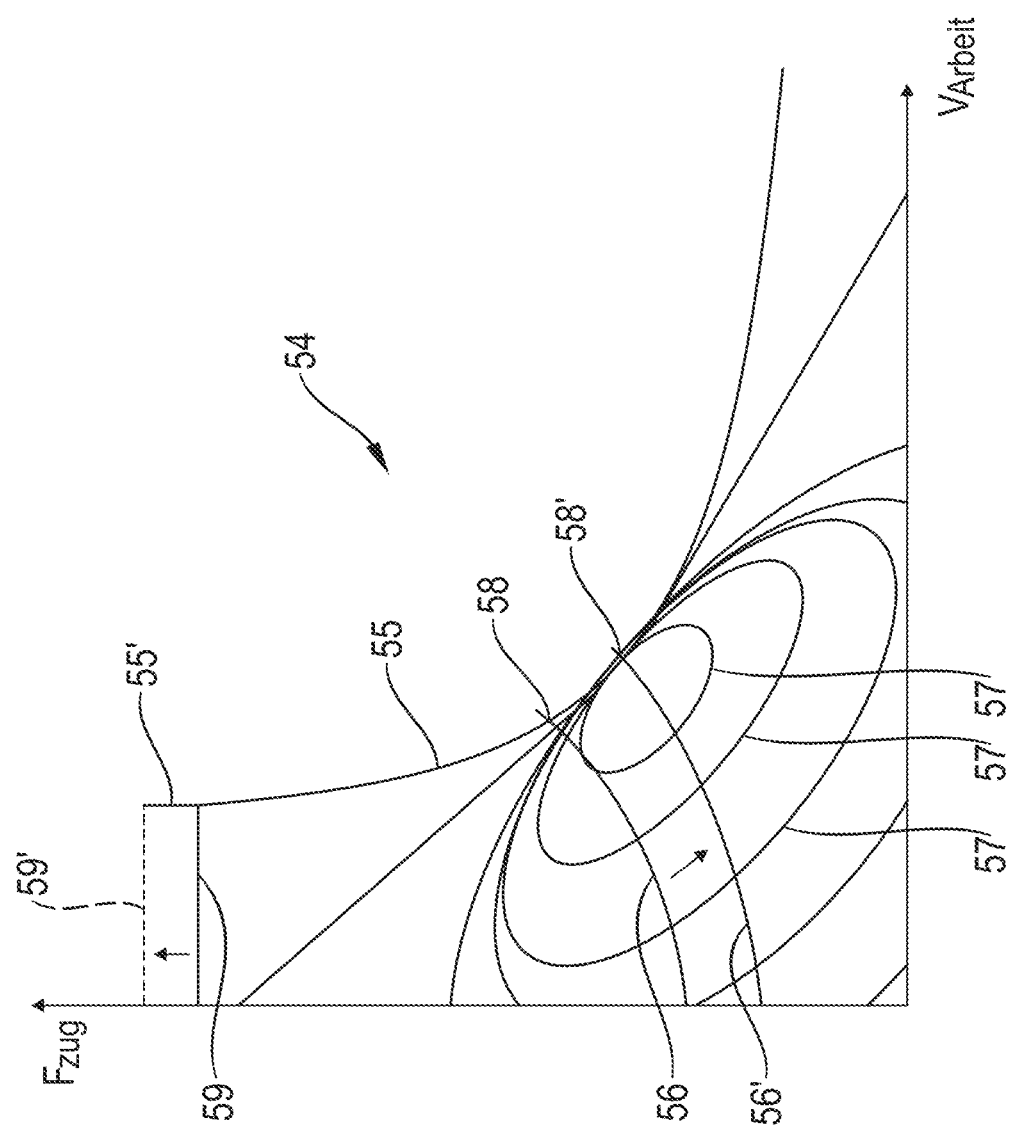
FIG. 5 illustrates an example of an n-dimensional characteristic map for controlling a lifting mechanism of the tractor.

The driver assistance system 3 may comprise an automatic lifting mechanism 32 that operates based on characteristics through which improved or optimized adjustment is effectuated by regulating the work parameters of the tractor 1 that have an influence on the vertical chassis force. In this regard, at least one n-dimensional characteristic map 54, explained further below with reference to the depiction according to FIG. 5, is saved in the memory unit 26 of the driver assistance system 3. In particular, the automatic lifting mechanism 32 may be configured for improved or optimized adjustment of at least one adjustment parameter of the at least one lifting mechanism 4 (such as one or both of lifting mechanisms 4 positioned in the front or the rear of the tractor 1) as a work parameter of the tractor 1 depending on selectable regulation strategies and/or optimization target variables saved in the memory unit 26. In the simplest case, this may be effectuated in that the automatic lifting mechanism 32 generates control signals A that are supplied to at least the control device 21 of the tractor 1 and the control unit 23, and effectuate the control of the lifting mechanism 4 there by generating corresponding control signals B (e.g., the control signals B, when executed, may modify actuators or the like resident on the tractor 1, as discussed above). Generally, tractors 1 have a front lifting mechanism and a rear lifting mechanism that may be adjusted jointly or independently of each other by the automatic lifting mechanism 32 (e.g., by the automatic lifting mechanism 32 generating one or more control signals B to modify operation of actuators 7).

In one or some embodiments, the control device 21 of the tractor 1 or alternatively the common control unit 23 of the tractor 1 and the attachment 2 adapted thereto may form the automatic lifting mechanism 32 together with the driver assistance system 3. The driver assistance system 3 may comprise a set of rules 33 assigned to the automatic lifting mechanism 32 that cause the operation of the tractor 1 and the attachment 2 to be improved or optimized by an improved or optimized controlling of the actuators 7 of the at least one lifting mechanism 4 to which the attachment 2 is adapted. The set of rules 33 may alternatively or in addition be retrievably saved in the control device 21 of the tractor 1 or the control device 22 of the attachment 2. The set of rules 33 may comprise algorithms, etc. in order to be able to control the tractor 1 and/or the attachment 2. Moreover, it lies within the scope of the invention that the required set of rules 33 may also be saved centrally on an external computing unit 24, which is not explained in greater detail, or any other backend system, such as saved on a backend server or a cloud-based computer, and may be retrieved via a bidirectional communication link between the tractor 1 and the external computing unit 24.

The optimization of at least one work parameter by the automatic lifting mechanism 32 may include considering the effect on the attachment 2 adapted to the lifting mechanism 4 as well as the reciprocal transfer of force between the tractor 1 and the attachment 2. The nature and the type of attachment 2 may be of great importance. Accordingly, attachments 2 designed as soil cultivation equipment, such as a plow or grubber, may have a different influence on the traction efficiency than other attachments 2, such as manure spreaders or pack top seed drills, that do not directly engage with the soil or only exert slight horizontal forces in comparison to soil cultivation equipment. The at least one work parameter may comprise at least one lifting mechanism adjustment parameter 34 from a group comprising any one, any combination, or all of: the lifting mechanism position 35 of the upper link 5 and the lower links 6, lower link force 36, length 37 of the upper link 5, upper link force 38, length 68 of a lifting strut 62, forces F, or lifting mechanism geometry G. The at least one lifting mechanism adjustment parameter 34 may be changed by controlling the actuators 7 using the control signal B.

The automatic lifting mechanism 32 that operates based on a characteristic curve may be configured for improved or optimized controlling of the actuators 7 depending on the selectable regulation strategies 39 and/or optimization target variables 40 saved in the memory unit 26. By selecting a regulation strategy 39 and/or one or more optimization target variables 40, the overall system comprising (or consisting of) a tractor 1 and attachment 2 is improved or optimized overall by adjusting at least one of the lifting mechanism adjustment parameters 34 via the automatic lifting mechanism 32. In one or some embodiments, "optimized overall" means that, in contrast to the prior art, the regulation of lifting mechanism adjustment (e.g., the lifting mechanism adjustment parameter 34) supports not just position regulation, tractive force regulation, or mixed regulation consisting of position and tractive force regulation, it also considers influences that, for example, result from occurring dispersions of efficiencies and/or operating behavior of the drivetrain 11 including the chassis of the tractor 1 that comprises the front axle VA and rear axle HA and the soil engagement means arranged thereupon. Advantageously, this may also consider the dispersions of efficiencies that occur in practice under different conditions of use.

Figure 3:
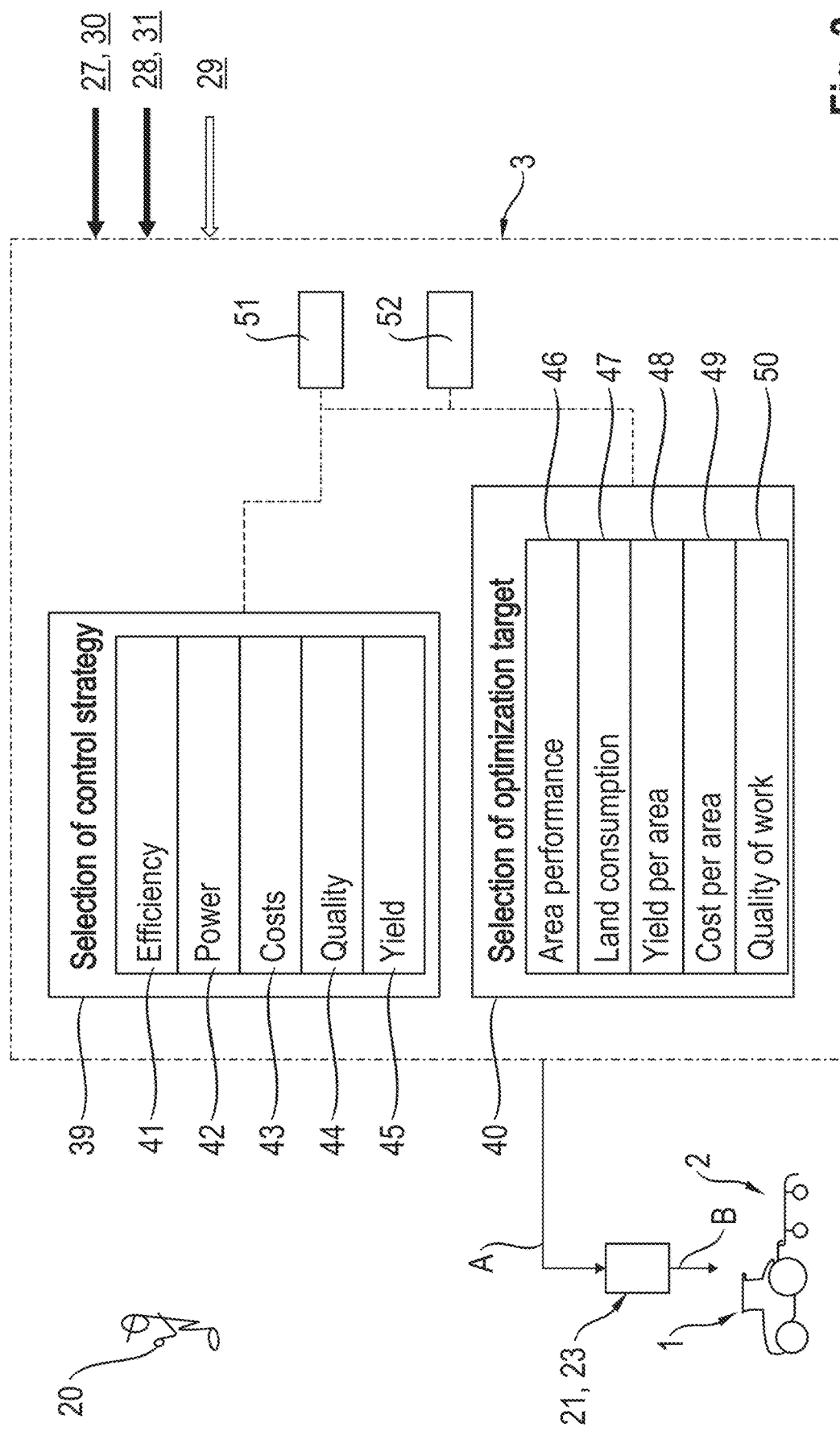
FIG. 3 illustrates a detail view of the driver assistance system.

The depiction in FIG. 3 shows a detailed view of the driver assistance system 3 of the tractor 1, wherein the visualization, operational and structural aspects are combined into one in the same depiction. To optimize the performance of the automatic lifting mechanism 32 of the tractor 1, the driver assistance system 3 comprises selectable regulation strategies 39, wherein the selectable regulation strategies 39 may be prime mover-specific strategies, attachment-specific strategies, and/or a combination of both. Considering the adapted attachment 2, efficient optimization of the controlling of the automatic lifting mechanism 32 of the tractor 1 results when the selectable regulation strategies 39 comprise at least one of the regulation strategies of "efficiency" 41, "performance" 42, "cost" 43, "quality" 44 as well as "yield" 45. In so doing, the "efficiency" 41 of consumption per area (e.g., gallon/acre) and/or the operating hours needed for cultivation are optimized according to the regulation strategy. The regulation strategy of "performance" 42 may be based on optimizing the output per area (e.g., acre/hour). The regulation strategy of "cost" 43 may improve or optimize the cost per area (e.g., $/per acre). The regulation strategy of "quality" 44 may yield an improvement or an optimization of the work parameters for the tractor 1 and attachment 2 to achieve even and best work quality. It is moreover contemplated to specify a weighted average comprising (or consisting of) all or parts of the aforementioned strategies through the least one work parameter.

Moreover, the driver assistance system 3 for optimizing the mode of operation of the tractor 1 by the optimized controlling of actuators 7 of the at least one automatic lifting mechanism 4 may comprise selectable optimization target variables 40. The optimization target variables 40 may be selected by the operator 20 alternatively or in addition to the regulation strategies 39.

The optimization target variables 40 may comprise any one, any combination, or all of: the "output per area" 46; "consumption per area" 47; "yield per area" 48; "cost per area" 49; or "work quality" 50. The selectable optimization target variables 40 make it possible to establish specific individual aspects, such as in different combinations with each other, for improvement or optimization of the lifting mechanism adjustment parameters 34 by the automatic lifting mechanism 32. The optimization target variable of "cost per area" 49 may, for example, primarily include any one, any combination, or all of accruing personnel costs, fuel costs, wear costs, or operating hours, etc. The optimization target variable of "performance per area" 46 may for example primarily concern increasing the cultivated area and/or processed bulk of feedstocks. The optimization target variable of "work quality" 50 tends, for example, to prioritize mixing of crop residues with the soil, crumbling, reconsolidation, feed quality, soil loosening, reduction of soil unevenness, etc. in optimization.

The driver assistance system 3 may also be configured such that it may either be operated in a dialog mode 51 with the operator 20 or in an automatic mode 52. In both cases, communication—the dialog with the operator 20—may occur in natural language.

The control device 21 of the tractor 1 together with the driver assistance system 3 may form the automatic lifting mechanism 32 in that the computing unit 25 of the driver assistance system 3 is configured to autonomously determine or ascertain generated information 27, external information 28, information 29 saved in the memory unit 26, which work parameters of the lifting mechanism 4, drivetrain 11, the tractor 1, the attachment 2 as well as environmental parameters 30, 31 from currently prevailing environmental conditions in order to implement the selected regulation strategy 39 and/or optimization target variable 40, and to specify such to the control device 21 in order for the control device 21 to control the actuators 7. This may be done by transmitting the control signals A to the control device 21 or control unit 23 that then, in turn, transmits a corresponding control signal B to the actuators 7.

Figure 4:
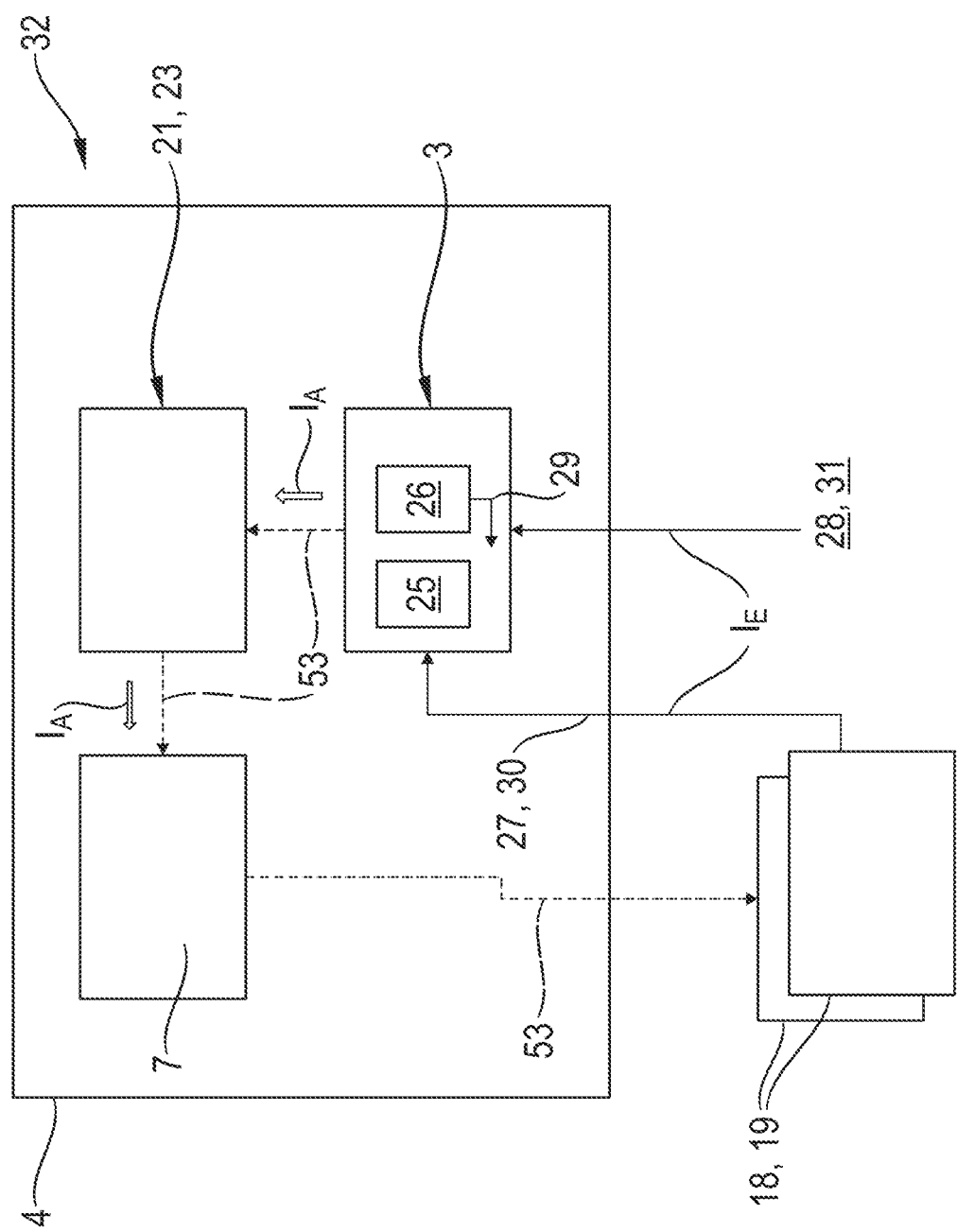
FIG. 4 illustrates a schematic representation of the structure of an automatic lifting mechanism.

FIG. 4 illustrates a schematic view of the structure of the automatic lifting mechanism 32. The automatic lifting mechanism 32 may comprise the at least one lifting mechanism 4, the associated actuators 7 for adjusting the lower link 6 and upper links 5, the control device 21 and the control unit 23, and the driver assistance system 3. Control signals B may be transmitted by the control device 21 to the actuators 7 via a data bus 53, through which at least one of the actuators 7 of the lifting mechanism 4 may be adjusted or modified. The sensor apparatus 19 assigned to the lifting mechanism 4 may monitor the actuators 7 in order to be able to determine the adjusted lifting mechanism adjustment parameters 34, lifting mechanism position 35 of the lower links, 6, lower link force 36, length 37 of the upper link 5 and upper link force 38 from the captured data from the actuators 7. Using the bus system 53, the sensor apparatus 19 provides its recorded data as generated information 27 at least to the driver assistance system 3 for evaluation. Moreover, information 27 and environmental parameters 30 generated from the other sensor apparatuses 18 and external information 28 and environmental parameters 31 may be provided to the driver assistance system 3 that, for example, are transmitted from other work machines and/or an external computing unit 24 on a farmstead to the tractor 1 and may influence the agricultural work process. Any one, any combination, or all of the data provided by the sensor apparatuses 18, 19, the generated information 27 and the external information 28, the information 29 saved in the memory unit 26, and environmental parameters 30, 31 may form input variables $I_E$ for the automatic lifting mechanism 32. $I_A$ identifies output variables of the automatic lifting mechanism 32 on which the generation of the control signals A and B may be based. The automatic lifting mechanism 32 may autonomously improve or optimize the mode of operation of the lifting mechanism 4 (e.g., the automatic lifting mechanism 32 is configured to continuously autonomously determine and specify the required adjustments of the lifting mechanism adjustment parameters 34 of the actuators 7 of the lifting mechanism 4). Using the automatic lifting mechanism 32, work parameters optimally adapted to the existing operating and harvesting conditions, such as lifting mechanism adjustment parameters 34, may be provided for the tractor 1.

FIG. 5 illustrates an example of an n-dimensional characteristic map 54 for controlling the actuators 7 of the lifting mechanism 4 of the tractor 1. A functional model of the tractor 1 and the attachment 2 may be saved in the memory unit 26 and may depict at least part of the functional relationships between the tractor 1 and the attachment 2 adapted to the lifting mechanism 4. Also contemplated are pure black box models that, for example, are based on artificial intelligence (AI) or neural networks or mixed forms in order to depict at least part of the functional relationships between the tractor 1 and the attachment 2. To depict the functional relationships between the tractor 1 and the attachment 2, the at least one n-dimensional characteristic map 54 is assigned to the work parameters of the tractive force characteristic 55, 55' of the tractor 1 and the tractive force characteristic 56, 56' of the attachment 2 depending on at least one lifting mechanism adjusting adjustment parameter 34, such as all lifting mechanism adjustment parameters 34, wherein the at least one lifting mechanism adjustment parameter 34 may be defined as an output variable $I_A$ of the at least one n-dimensional characteristic map 54. The tractive force characteristics 55 and 56 result for a first adjustment of at least one lifting mechanism adjustment parameter 34, and the tractive force characteristics 55' and 56' result for a second adjustment of the at least one lifting mechanism adjustment parameter 34 that differs from the first adjustment. The n-dimensional characteristic map 54 comprises, for example, at least three input variables $I_E$.

The working speed $v_{Arbeit}$ is plotted against the tractive force $F_{Zug}$ as input variables $I_E$ in the characteristic map 54. The output variable $I_A$ forms the at least one lifting mechanism adjustment parameter 34. The reference numbers 55, 55' and 56, 56' identify the tractive force characteristics of the tractor 1 and the attachment 2 with differently adjusted lifting mechanism adjustment parameters 34, which are each depicted as examples in the n-dimensional characteristic map 54. 59 and 59' identify the maximum tractive force of the tractor 1 for differently adjusted lifting mechanism adjustment parameters 34. Moreover, lines 57 are shown in the background as constant specific fuel consumption in the form of so-called "shell curves". The particular intersection of the tractive force characteristic 56, 56' of the attachment 2 with the tractive force characteristic 55 and 55' of the tractor 1 defines an operating point 58 and 58' that results at a full load with different adjustments of the lifting mechanism adjustment parameters 34. The lines 57 of constant specific fuel consumption may be calculated for a specific operating state given a known configuration of the drivetrain 11.

Accordingly, for example, changing the lifting mechanism adjustment parameters 34 may cause an increase in the tractive force $F_{Zug}$ of the tractor 1, starting from the maximum tractive force 59 according to the tractive force characteristic 55, to the maximum tractive force 59 according to the tractive force characteristic 55' of the tractor 1. Corresponding to this, the tractive force characteristic 56 that arises from the first adjustment of the lifting mechanism adjustment parameters 34 shifts to the tractive force characteristic 56' of the attachment 2 that arises from the second adjustment of the lifting mechanism adjustment parameters 34.

A specific operating state may be established by determinable work parameters of the tractor 1, such as any one, any combination, or all of the drivetrain 11, the at least one ancillary unit 15 of the drivetrain 11, or the attachment 2, and/or by the environmental parameters 30, 31 resulting from the environmental conditions which include, inter alia, any one, any combination, or all of the soil character, soil type, soil state, soil moisture, topography, or weather. The work parameters may be determined by measurement, calculation, or in another manner. The work parameters of any one, any combination, or all of the drivetrain 11, the at least one ancillary unit 15, the attachment 2, the hydraulic drivetrain, the electric drivetrain or environmental parameters 30, 31 determined using the currently prevailing environmental conditions may form the parameters to be considered for the improved or the optimized control of the actuators 7 of the lifting mechanism 4 (e.g., by the automatic lifting mechanism 32 for optimum adjustment).

The n-dimensional characteristic map 54 may arise or result from the fundamental knowledge of the characteristic of the tractive force $F_{Zug}$ of the tractor 1, the tractive force requirement of the attachment 2, and the energy consumption over the working speed $v_{Arbeit}$ for various boundary conditions. When jobs are being performed by the tractor 1, the precise form of the n-dimensional characteristic map 54 may be adapted or modified to the current conditions of use by ascertaining one or more of the parameters plotted in the characteristic map 54. The knowledge of the characteristic map 54 may allow the automatic lifting mechanism 32 to automatically adjust the lifting mechanism adjustment parameter(s) 34 so that the system behavior of the tractor 1 and/or attachment 2 is improved or optimized corresponding to the particular target variable that results from the selected regulation strategy 39 and/or optimization target variable 40. The manipulated variables may comprise the lifting mechanism adjustment parameters 34.

Changing the lifting mechanism adjustment parameters 34 has an influence or an effect on the placement of the tractive force characteristics 55, 55' and 56, 56' in the characteristic map 54, and hence on the transmitted output. The lines 57 of constant specific fuel consumption may be calculated for an operating state given a known configuration of the drivetrain. Relevant operating states may be defined or determined in the described exemplary embodiment for example by any one, any combination, or all of:

Lifting mechanism position
Working depth of the attachment
Signals from sensor apparatuses 19, designed as tractive force measuring pins, in the lifting mechanism 4
Traction booster adjustments
Forces in the attachment interface
Different engine droop
Different inner tire pressures
Different control of an ancillary unit 15
Output power of the drive motor 12
Output power of the gearbox 13 or gearbox load
Drive power of an ancillary unit determined from the difference between the motor output power and the output power of the gearbox 13 taking into account a characteristic map of gearbox efficiency
Power flow in the power take-off 14

Power flow in a hydraulic drivetrain
Power flow in an electric drivetrain
Slip
Tilt angle of the tractor
Engine speed
Gearbox ratio
Theoretical and real driving speed
Tire size and tire type
Tilt angle in a transverse and longitudinal direction
Tractor geometry
Attachment weight
Attachment geometry
Attachment type
Soil character
Soil type
Soil state
Soil humidity This non-exhaustive list of work parameters and operating parameters that are at least partially available or may be provided in the form of the data 28, 29, as well as the environmental parameters 30, 31, may influence the improved or optimized adjustment of the at least one work parameter of the tractor 1, such as the lifting mechanism adjustment parameters 34 of the at least one lifting mechanism 4.

The work parameters of the drivetrain 11 comprise, inter alia, any one, any combination, or all of the output power of the at least one drive motor 12, the output power of the gearbox 13 or the gearbox load, the drive power of the at least one ancillary unit 15 and/or the at least one power take-off 14, the slip between the wheels VR, HR of the tractor 1 designed as soil engagement means, and the soil, the motor rotational speed, the driving speed, the gearbox ratio, the status of the all-wheel drive and/or differential lock, and/or the power flow in the drivetrain of the power take-off 14, in the hydraulic drivetrain or in the electric drivetrain. Accordingly, for example, the drive power of at least one ancillary unit 15 may be determined from the difference between the output power of the drive motor 12 and the output power of the gearbox 13 taking into account the characteristic map of the gearbox efficiency.

Other work parameters of the tractor 1 are, inter alia, any one, any combination, or all of a tilt angle of the tractor 1 in the transverse and longitudinal direction, the weight of the tractor 1, ballast, tire size and tire type of the wheels VR, HR on the axles the VA, HA, axle loads, wheel forces, wheel torques and traction parameters that are sensed by one of the sensor apparatuses 18, 19, or may be calculated from data detected by the sensor apparatuses 18, 19, or otherwise received or saved data.

Moreover, the work parameters of the attachment 2 may comprise any one, any combination, or all of the nature and/or type of attachment 2, the working width, the lift position, the working depth and other setting parameters of the attachment 2, such as the front furrow width, traction point, contact pressure and the like.

The environmental parameters 30, 31 form, inter alia, any one, any combination, or all of the soil character, soil type, soil state, soil moisture, the topography, the weather and the like.

The computing unit 25 may match the at least one n-dimensional characteristic map 54 during ongoing operation, such as cyclically or periodically (e.g., in periodic intervals), with the conditions of use of the tractor 1 and the attachment 2 adapted thereto. In this case, at least one n-dimensional initial characteristic map 54*i* may be saved in the memory unit 26. Accordingly, in the first determination of the lifting mechanism adjustment parameters 34 after selecting a regulation strategy 39 or optimization target variable 40, the computing unit 25 of the driver assistance system 3 may undertake the determination based on the initial characteristic map 54*i*.

Moreover, the computing unit 25 may be configured to autonomously perform an adaptation of the form of the initial characteristic map 54*i* to existing conditions of use by using design values and/or the measured work parameters in the form of any one, any combination, or all of the generated information 27, the external information 28, and the information 29 saved in the memory unit 26, or the environmental parameters 30, 31, or alternatively or in addition, by approaching sampling points in the initial characteristic map 54*i*. Starting from the initial characteristic map 54*i*, the form of the initial characteristic map 54*i* may be adapted to the current conditions of use so that the adaptation of the initial characteristic map 54*i* is generated by adjusting predefined operating points that represent the sampling points in the characteristic map 54. In this regard, in a first step, design values or respectively work parameters as well as environmental parameters 30, 31 are acquired using the particular sensor apparatuses 18, 19 and/or received as external information 28, and preprocessed by the computing unit 25. The design values determined in this manner, or respectively the work parameters such as any one, any combination, or all of the rotational speeds, forces, slip or driving speed may be entered into the n-dimensional initial characteristic map 54*i*. In particular, the design values, or respectively the work parameters, may be entered into the n-dimensional initial characteristic map 54*i* when these are more-or-less stationary (e.g., constant) or have achieved a more-or-less stationary state.

If individual design values determined by the sensor apparatuses 18, 19 are missing in the n-dimensional space of the initial characteristic map 54*i* because they do not occur during regular field travel, or are only insufficiently present since they are not approached during standard operation of the tractor 1 and/or the attachment 2, specific sampling points may be actively approached instead. The second step may include the checking and adaptation/modification of the functional model of the tractor 1 and attachment 2 based on changes in the current conditions of use that in turn are determined using the work parameters (e.g., any one, any combination, or all of the generated information 27, the external information 28 and the information 29 saved in the memory unit 26, or the available environmental parameters 30, 31).

Figure 6:
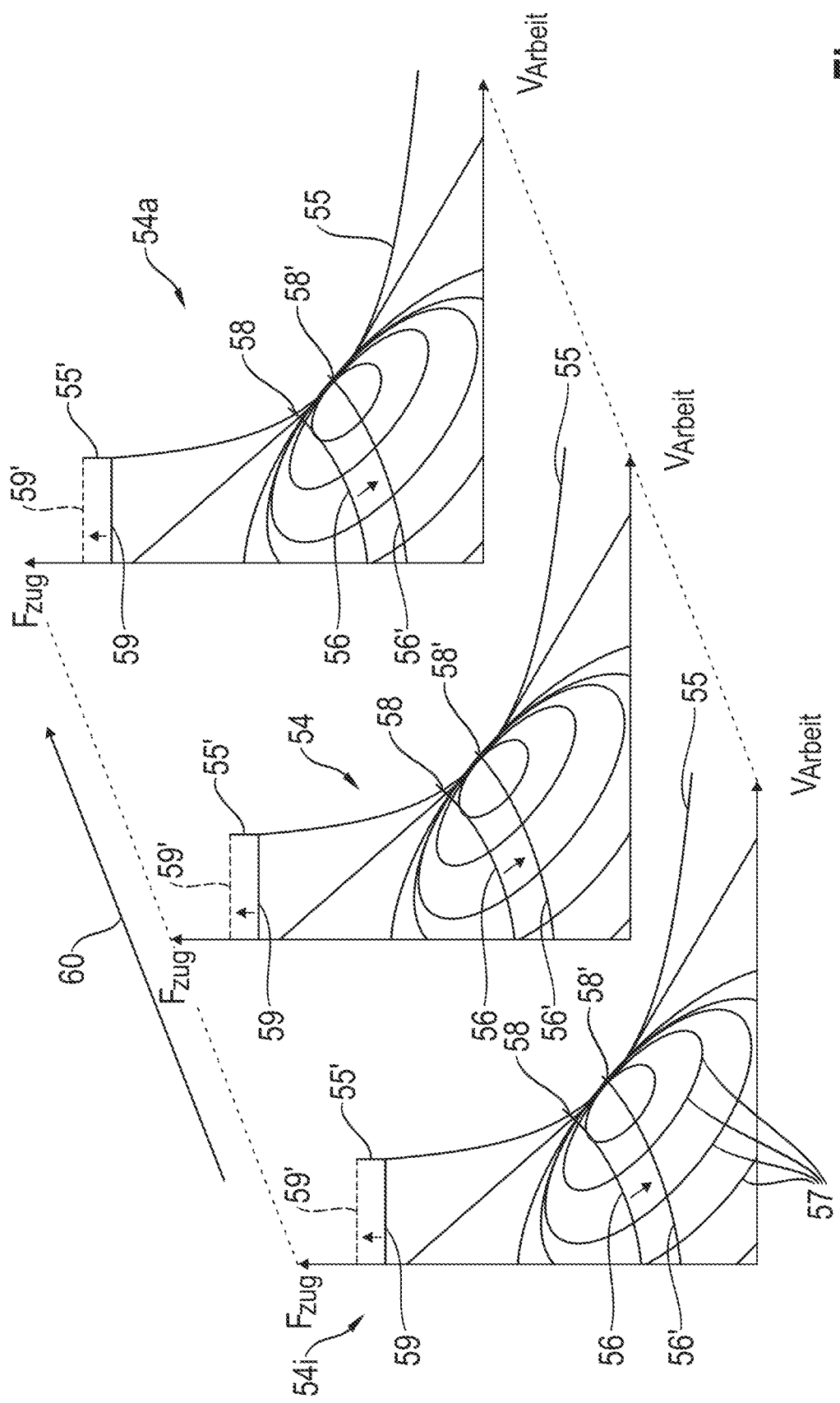
FIG. 6 illustrates an example of an initial characteristic map that is adapted based on a change to a work parameter of the tractor.

The depiction in FIG. 6 simply shows an example of an n-dimensional initial characteristic map 54*i* that is adapted as an example based on a change to at least one work parameter in the drivetrain 11. The at least one changing work parameter is, for example, the rotational speed of the ancillary unit 15 designed as an engine fan which increases during operation depending on the load on the drive motor 12, as illustrated in FIG. 5 by the arrow 60. The increase (shown by arrow 60) in the rotational speed of the engine fan as an ancillary unit 15 leads to an adaptation/modification of the initial characteristic map 54*i* to the characteristic map 54, or further to a re-adapted characteristic map 54*a* due to changing work conditions, environmental conditions, work parameters, etc.

Figure 7:
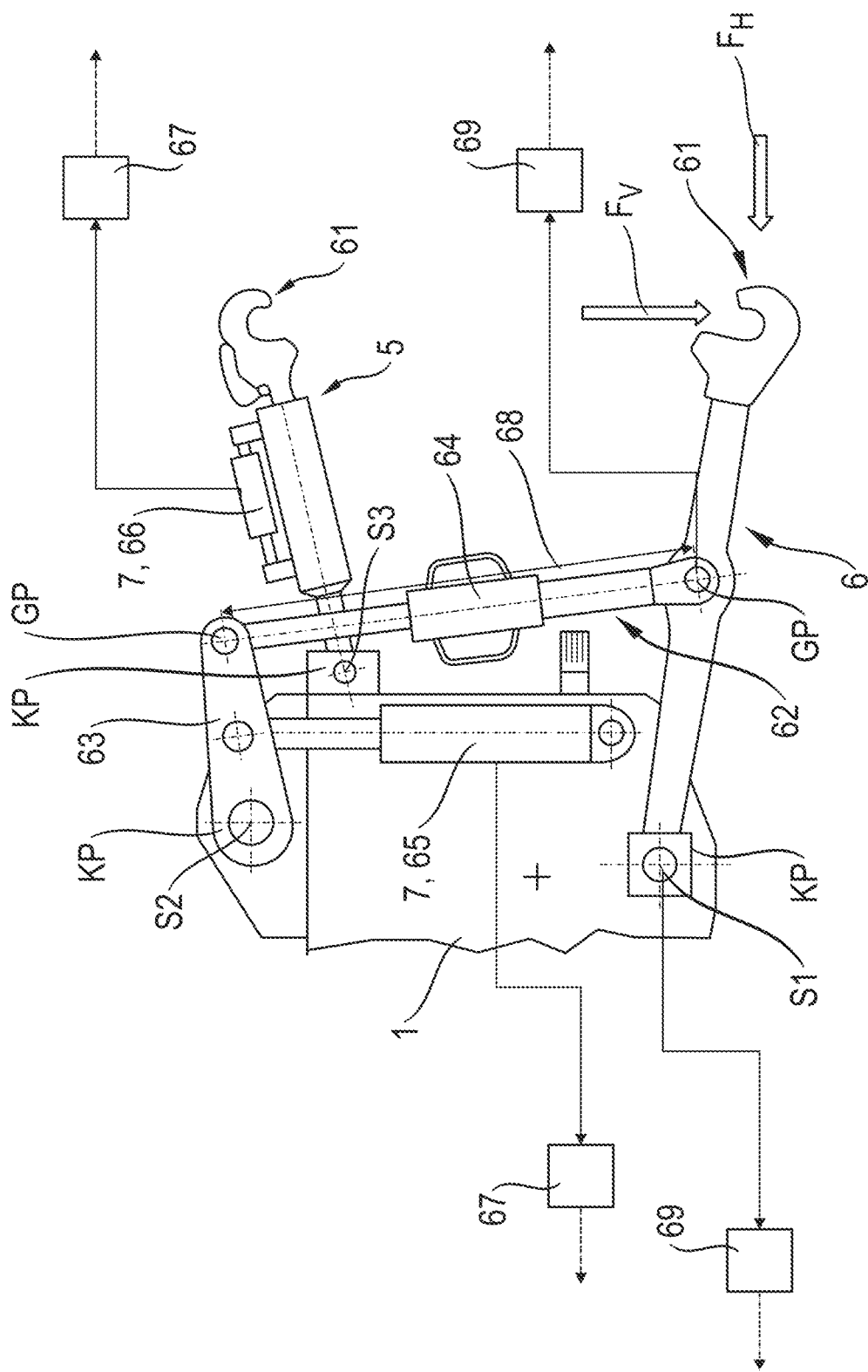
FIG. 7 illustrates a schematic side view of the lifting mechanism of the tractor designed as a three-point rear power lifter.

FIG. 7 illustrates a schematic side view of the lifting mechanism 4 of the tractor 1 designed as a three-point rear power lifter that comprises the two elongated lower links 6 that are arranged or positioned lengthwise next to each other with a predetermined link spacing from each other, and the elongated upper link 5 that is arranged in the middle of the link spacing between and approximately parallel to the lower links 6. The lower links 6 each have a front lower link longitudinal end on which a receiving element 61 that is designed as a latch open at the top is provided, and a rear lower link longitudinal end that is mounted pivotably on a coupling point KP of the tractor 1 so that the lower link 6 may pivot about a pivot axis S1 running perpendicular to the longitudinal direction of the tractor 1 and approximately horizontally, and the particular receiving element 61, or respectively the latch, is therefore adjustable in height.

The lower links 6, using an adjustable lifting rod or lifting strut 62 that is adjustable in length 68 (in FIG. 7, only one lifting strut 62 is visible) may each be pivotably connected to a particular lifting arm 63 or lifting shaft pivotably mounted on the tractor 1 (in FIG. 7, only one lifting arm 63 is visible). To accomplish this, the particular lifting struts 62 are connected at an articulation point GP to the lower link 6 as well as the lifting arm 63. The lifting arms 63 or the lifting shafts are pivotably articulated to the tractor 1 about an approximately horizontally running pivot axis S2. The longitudinal adjustment of the particular lifting strut 62 may, for example, be performed manually by an actuator 64 designed as a threaded spindle. A design of the actuator 64 as a linear drive is also contemplated. To effectuate or drive a pivoting movement of the lifting arm 63 and thereby a pivoting movement of the lower link 6 connected thereto, an actuator 7 designed as a lifting mechanism cylinder 65 is provided for each lifting arm 63 and is pivotably mounted at one longitudinal end (e.g., piston rod or cylinder) to the tractor 1, and is pivotably connected at the other longitudinal end (e.g., cylinder or piston rod) to the lifting arm 63. Given the longitudinal adjustability of the lifting strut 62, a height of the particular lower link 6 or a height of its receiving elements 61 may be preadjusted. The length 68 of the lifting strut 62 may comprise another lifting mechanism adjustment parameter 34 from the group of lifting mechanism adjustment parameters 34.

In a manner similar to the lower links 6, the upper link 5 has a front upper link longitudinal end at which is provided a receiving element 61 designed as a latch open at the bottom, and a rear upper link longitudinal end that is pivotably mounted about a pivot axis S3 to another coupling point KP of the tractor 1 so that the upper link 5 is pivotable, and the receiving element 61 may therefore be adjustable in height. Although not shown and described here in greater detail, the drive for the pivoting movement of the upper link 5 may be realized in a manner similar to the lower links 6. The upper link 5 may be longitudinally adjustable using an actuator 7, such as a hydraulic cylinder 66.

At least one work parameter comprises at least one resulting force F or force component $F_H$, $F_V$ transmitted by the attachment 2 to the tractor 1 that act or acts in a horizontal and/or vertical direction as indicated only as an example on the receiving element 61 of the lower link 6. Additional forces correspondingly arise inter alia at the receiving element 61 of the second lower link 6 as well as the receiving element 61 of the upper link 5.

At least one force measuring system 67 is assigned to the actuators 7. In one or some embodiments, each of the actuators 7 of the lifting mechanism 4 has a force measuring system 67 that determines the forces absorbed in the actuators 7, designed as lifting mechanism cylinders 65 or as hydraulic cylinders 66, of the lifting mechanism 4. To accomplish this, exerted or absorbed forces F or force components $F_H$, $F_V$ may, for example, be determined from the particular pressures in the lifting mechanism cylinders 65 or the hydraulic cylinder 66. Moreover, force measuring apparatuses such as force measuring pins may be arranged at least in the coupling points KP. Signals indicative of the force measured generated by the force measuring systems 67 or evaluated data may be transmitted to the driver assistance system 3, the data (e.g., indicative of exerted or absorbed forces or force components) being transferred to the driver assistance system 3 if the force measuring systems 67 have their own evaluation unit, for further editing and processing.

In addition or alternatively, at least one of the lifting struts 62 that are changeable in length may be assigned another force measuring system 69. The force measuring system 69 may be configured to determine absorbed or introduced horizontal and/or vertical forces $F_H$, $F_V$ through the receiving element 61, or respectively the latches (e.g., the force measuring system 69 is configured to generate data indicative of absorbed or introduced horizontal and/or vertical forces). To accomplish this, suitable force measuring devices may, for example, be arranged or positioned in the articulation points GP. This allows the longitudinal forces in the lifting struts 62 to be determined.

In addition, position sensors are arranged or positioned at least in the coupling points KP, through which at least the particular position of the upper link 5, lower links 6 and lifting arms 63 may be determined. The position data make it possible to infer the currently adjusted lifting mechanism geometry G together with information about the length 37 of the upper link 5, the length 68 of the lifting struts 62, the length of the lower links 6, as well as other variables influencing the geometry.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

| List of Reference Numbers | | | |
|---|---|---|---|
| 1 | Tractor | 34 | Lifting mechanism adjustment parameter |
| 2 | Attachment | 35 | Lifting mechanism position |
| 3 | Driver assistance system | 36 | Lower link force |
| 4 | Lifting mechanism | 37 | Length |
| 5 | Upper link | 38 | Upper link force |
| 6 | Lower link | 39 | Regulation strategy |
| 7 | Actuator | 40 | Optimization target variable |
| 8 | Ballast weight | 41 | Efficiency |
| 9 | Input interface | 42 | Performance |
| 10 | Input device | 43 | Costs |
| 11 | Drivetrain | 44 | Quality |
| 12 | Drive motor | 45 | Yield |
| 13 | Gearbox | 46 | Output per area |
| 14 | Power take-off | 47 | Consumption per area |
| 15 | Ancillary unit | 48 | Yield per area |
| 16 | Engine control module | 49 | Cost per area |
| 17 | Gearbox control module | 50 | Work quality |
| 18 | Sensor apparatus | 51 | Dialog mode |
| 19 | Sensor apparatus | 52 | Automatic mode |
| 20 | Operator | 53 | Bus system |
| 21 | Control device | 54 | Characteristic map |
| 22 | Control device | 54i | Initial characteristic map |

-continued

List of Reference Numbers

| | | | |
|---|---|---|---|
| 23 | Control unit | 54a | Adapted characteristic map |
| 24 | External computing unit | 55, 55' | Tractive force characteristic curve |
| 25 | Computing unit | 56, 56' | Tractive force characteristic curve |
| 26 | Memory unit | 57 | Line of constant fuel consumption |
| 27 | Generated information | 58, 58' | Operating point |
| 28 | External information | 59, 59' | Maximum tractive force |
| 29 | Savable information | 60 | Arrow |
| 30 | Environmental parameters | 61 | receiving element |
| 31 | External environmental parameter | 62 | Lifting strut |
| 32 | Automatic lifting mechanism | 63 | Lifting arm |
| 33 | Set of rules | 64 | Actuator |
| 65 | Lifting mechanism cylinder | | |
| 66 | Hydraulic cylinder | | |
| 67 | Force measuring system | | |
| 68 | Length of 62 | | |
| 69 | Force measuring system | | |
| A | Control signal | | |
| B | Control signal | | |
| $I_E$ | Input variable | | |
| $I_A$ | Output variable | | |
| VA | Front axle | | |
| HA | Rear axle | | |
| VR | Wheel | | |
| HR | Wheel | | |
| $V_{Arbeit}$ | Working speed | | |
| $F_{Zug}$ | Tensile force | | |
| KP | Coupling point | | |
| GP | Articulation point | | |
| S1, | Pivot axis | | |
| S2 | Pivot axis | | |
| S3 | Pivot axis | | |
| F | Force | | |
| $F_H$ | Horizontal force | | |
| $F_V$ | Vertical force | | |
| G | Lifting mechanism geometry | | |

The invention claimed is:

1. A tractor comprising:
at least one lifting mechanism that has an upper link and one or more lower links and actuators associated therewith;
at least one attachment configured for operation with the at least one lifting mechanism; and
a driver assistance system including at least one computing unit, at least one memory unit, and at least one input interface;
wherein the driver assistance system comprises an automatic lifting mechanism configured to generate, based on one or both of at least one selectable regulation strategy from a plurality of selectable regulation strategies or at least one optimization target variable from a plurality of optimization target variables, one or more commands in order to dynamically control at least one aspect of the at least one lifting mechanism based on input from an operator of the tractor in order to adjust at least one work parameter of the tractor, wherein the input from the operator of the tractor via the at least one input interface is indicative of selecting the one or both of the at least one selectable regulation strategy from the plurality of selectable regulation strategies or the at least one optimization target variable from the plurality of optimization target variables;
wherein the driver assistance system includes a functional model of the tractor and the attachment saved in the at least one memory unit and depicts at least part of at least one functional relationship of the tractor and the attachment adapted thereto;
wherein the functional model comprises at least one n-dimensional characteristic map assigned to at least one lifting mechanism adjustment parameter to depict the at least one functional relationship of the tractor and the attachment adapted thereto;
wherein a value associated with the at least one lifting mechanism adjustment parameter is defined as an output variable of the at least one n-dimensional characteristic map; and
wherein the driver assistance system is configured to generate the one or more commands in order to modify the at least one lifting mechanism to the value associated with the at least one lifting mechanism adjustment parameter output from the at least one n-dimensional characteristic map.

2. The tractor of claim 1, wherein the automatic lifting mechanism is configured to generate the one or more commands based on an effect of the one or more commands on the attachment adapted to the at least one lifting mechanism and based on a reciprocal transfer of force between the tractor and the attachment.

3. The tractor of claim 1, wherein, in generating the one or more commands, the automatic lifting mechanism is configured for optimized adjustment of the at least one work parameter of the tractor; and
wherein the at least one work parameter comprises at least one of resulting force or force component transmitted by the attachment to the tractor that acts in one or both of a horizontal or a vertical direction.

4. The tractor of claim 3, wherein the one or more commands are configured to modify the at least one work parameter; and
wherein the at least one work parameter includes at least one lifting mechanism adjustment parameter comprising a lifting mechanism position of one or both of the upper link or the one or more lower links, lifting mechanism force of the one or more lower links, length of one or both of the upper link or the one or more lower links, upper link force, length of a lifting strut, or lifting mechanism geometry.

5. The tractor of claim 3, wherein the driver assistance system is configured to receive external information in order to determine one or both of the at least one work parameter or one or more environmental parameters; and
wherein the driver assistance system is configured to generate the one or more commands based on the at least one selectable regulation strategy, the at least one optimization target variable and the one or both of the at least one work parameter or one or more environmental parameters.

6. The tractor of claim 3, further comprising a control device resident in the tractor and configured to control and regulate the one or both of the tractor or the attachment; and
wherein the control device of the tractor together with the driver assistance system forms the automatic lifting mechanism in that the at least one computing unit is configured to autonomously ascertain parameters for implementing the at least one selectable regulation strategy and the at least one optimization target variable, and to specify the parameters to the control device of the tractor, that affects the at least one working parameter to be adjusted.

7. The tractor of claim 6, wherein the parameters for optimized control of the at least one lifting mechanism comprise one or more of work parameters of the tractor, work parameters of a drivetrain of the tractor, work parameters of the attachment, or environmental parameters resulting from environmental conditions; and further comprising one or more sensor apparatuses positioned on the tractor and configured to determine one or both of the work parameters or the environmental parameters.

8. The tractor of claim 1, wherein the at least one aspect controlled by the one or more commands comprise the actuators;

wherein the automatic lifting mechanism is configured to generate, based on the at least one selectable regulation strategy, the one or more commands in order to control the actuators of the at least one lifting mechanism; and wherein the at least one selectable regulation strategy comprises one or more of efficiency, performance, cost, quality, or yield.

9. The tractor of claim 1, wherein the at least one aspect controlled by the one or more commands comprise the actuators;

wherein at least one actuator of the at least one lifting mechanism is designed as a lifting mechanism cylinder with a force measuring system assigned to the at least one actuator that is configured to generate data indicative of exerted or absorbed forces or force components; and wherein the driver assistance system is configured to generate the one or more commands based on the data indicative of exerted or absorbed forces or force components.

10. The tractor of claim 1, wherein the at least one lifting mechanism includes a length-changeable lifting strut with a force measurement system assigned to the lifting strut and configured to generate data indicative of absorbed or introduced one or both of horizontal or vertical forces;

wherein the at least one aspect controlled by the one or more commands comprise at least one actuator configured to modify length of the lifting strut; and wherein the driver assistance system is configured to generate the one or more commands based on the data indicative of exerted or absorbed forces or force components.

11. The tractor of claim 1, wherein the driver assistance system is configured to use the functional model, the at least one selectable regulation strategy, and the at least one optimization target variable, in order to generate the one or more commands.

12. A tractor comprising:
at least one lifting mechanism that has an upper link and one or more lower links and actuators associated therewith;
at least one attachment configured for operation with the at least one lifting mechanism; and
a driver assistance system including at least one computing unit, at least one memory unit, and at least one input interface;
wherein the driver assistance system comprises an automatic lifting mechanism configured to generate, based on one or both of at least one selectable regulation strategy or at least one optimization target variable, one or more commands in order to control at least one aspect of the at least one lifting mechanism in order to adjust at least one work parameter of the tractor;

wherein the driver assistance system includes a functional model of the tractor and the attachment saved in the at least one memory unit and depicts at least part of at least one functional relationship of the tractor and the attachment adapted there to;

wherein the driver assistance system is configured to use the functional model, the at least one selectable regulation strategy, and the at least one optimization target variable, in order to generate the one or more commands;

wherein the functional model comprises at least one n-dimensional characteristic map assigned to at least one lifting mechanism adjustment parameter to depict the at least one functional relationship of the tractor and the attachment adapted thereto;

wherein a value associated with the at least one lifting mechanism adjustment parameter is defined as an output variable of the at least one n-dimensional characteristic map; and wherein the driver assistance system is configured to generate the one or more commands in order to modify the at least one lifting mechanism to the value associated with the at least one lifting mechanism adjustment parameter output from the at least one n-dimensional characteristic map.

13. The tractor of claim 12, wherein input variables of the at least one n-dimensional characteristic map comprise the at least one work parameter of the tractor or the attachment and environmental parameters indicative of environmental conditions.

14. The tractor of claim 13, wherein the driver assistance system is configured to:
access at least one n-dimensional initial characteristic map for the at least one lifting mechanism adjustment parameter;
generate, using the at least one n-dimensional initial characteristic map, a value of an initial lifting mechanism adjustment parameter;
generate the one or more commands in order to modify the at least one lifting mechanism to the value of the initial lifting mechanism adjustment parameter output from the at least one n-dimensional initial characteristic map; and
iteratively match, based on existing conditions of use of the tractor and the attachment, during operation of the tractor from the at least one n-dimensional initial characteristic map to at least one n-dimensional updated characteristic map.

15. The tractor of claim 14, wherein the driver assistance system is configured to perform an adaptation of a form of the at least one n-dimensional initial characteristic map to the existing conditions of use by using determined work parameters of the tractor or by approaching sampling points in the at least one n-dimensional initial characteristic map.

16. A method for operating a tractor comprising:
using the tractor that includes: at least one lifting mechanism that has an upper link and one or more lower links and actuators associated therewith; at least one attachment configured for operation with the at least one lifting mechanism; and a driver assistance system including at least one computing unit, at least one memory unit, and at least one input interface;
accessing indicators of one or both of at least one selectable regulation strategy or at least one optimization target variable;
receiving input from an operator of the tractor via at least one input interface, the input being indicative of selecting one or both of at least one selectable regulation strategy from a plurality of selectable regulation strategies or at least one optimization target variable from a plurality of optimization target variables;

generating, using an automatic lifting mechanism and based on the indicators of the one or both of the at least one selectable regulation strategy from the plurality of selectable regulation strategies or the at least one optimization target variable from the plurality of optimization target variables, one or more commands in order to dynamically control at least one aspect of the at least one lifting mechanism; and executing the one or more commands in order to adjust at least one work parameter of the tractor;

wherein the driver assistance system includes a functional model of the tractor and the attachment saved in the at least one memory unit and depicts at least part of at least one functional relationship of the tractor and the attachment adapted thereto;

wherein the functional model comprises at least one n-dimensional characteristic map assigned to at least one lifting mechanism adjustment parameter to depict the at least one functional relationship of the tractor and the attachment adapted thereto;

wherein a value associated with the at least one lifting mechanism adjustment parameter is defined as an output variable of the at least one n-dimensional characteristic map; and wherein the driver assistance system generates the one or more commands in order to modify the at least one lifting mechanism to the value associated with the at least one lifting mechanism adjustment parameter output from the at least one-dimensional characteristic map.

17. The tractor of claim 14, wherein the at least one input interface is configured to input from the operator of the tractor both the at least one selectable regulation strategy from the plurality of selectable regulation strategies and the at least one optimization target variable from the plurality of optimization target variables.

18. The tractor of claim 17, wherein the functional model of the tractor and the attachment is dependent on the input from the operator and includes variables for one or both of tractive force or lifting mechanism position of one or both of the upper link or the one or more lower links.

19. The method of claim 16, wherein the driver assistance system uses the functional model, the at least one selectable regulation strategy, and the at least one optimization target variable, in order to generate the one or more commands.

20. The method of claim 16, wherein the at least one input interface inputs from the operator of the tractor both the at least one selectable regulation strategy from the plurality of selectable regulation strategies and the at least one optimization target variable from the plurality of optimization target variables.

* * * * *